UNITED STATES PATENT OFFICE.

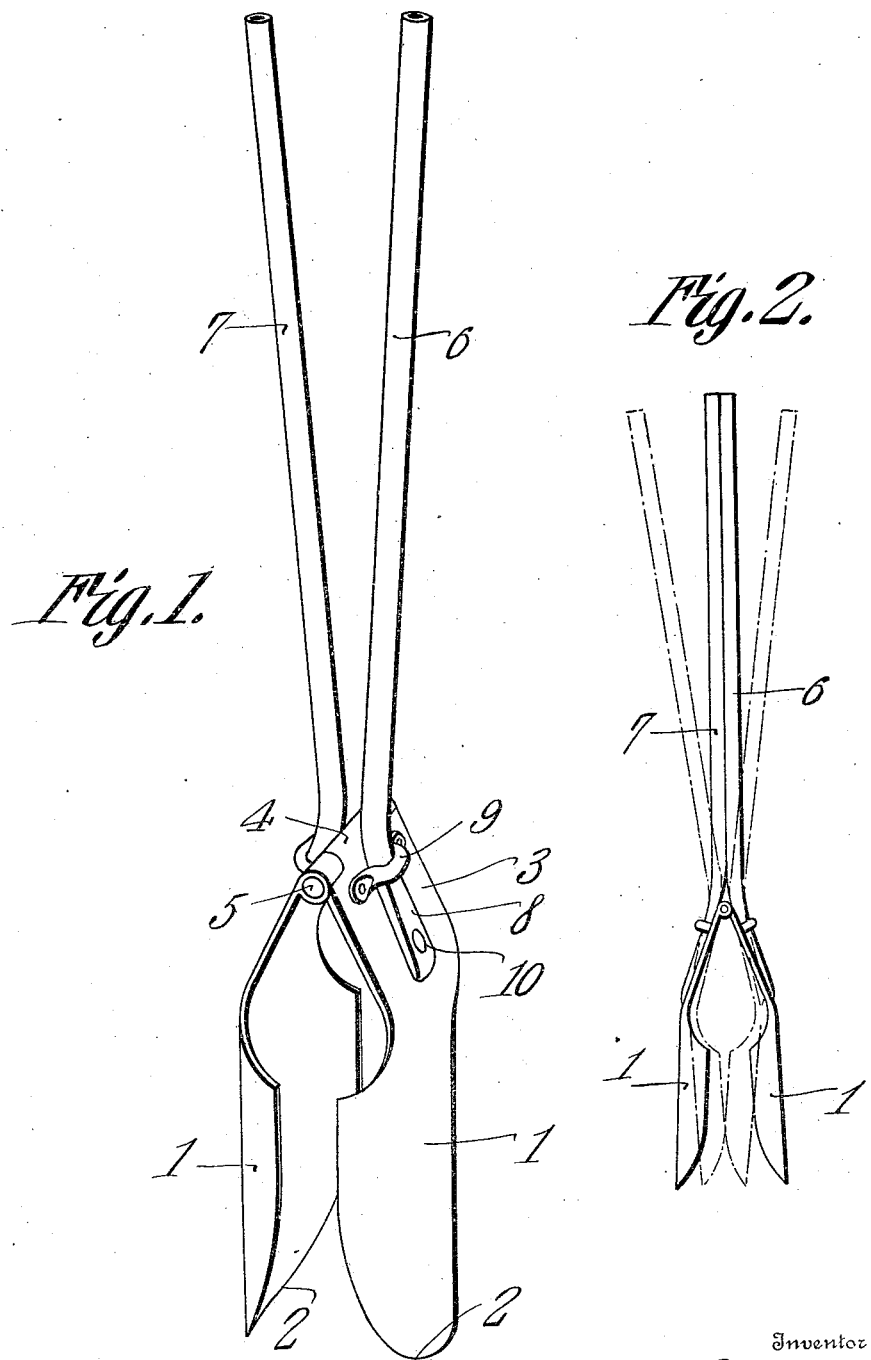

JOHN M. HEFNER, OF BRYANS MILL, TEXAS.

POST-HOLE DIGGER.

944,552.　　　　Specification of Letters Patent.　　Patented Dec. 28, 1909.

Application filed July 14, 1909. Serial No. 507,577.

*To all whom it may concern:*

Be it known that I, JOHN M. HEFNER, a citizen of the United States, residing at Bryans Mill, in the county of Cass and State of Texas, have invented a new and useful Post-Hole Digger, of which the following is a specification.

My invention relates to post-hole diggers and has for an object to provide a device of this character in which the handles will be disposed in the most advantageous manner for manipulation of the device in digging a post-hole, and will be connected directly to the shovel blades without the use of the usual sockets, brackets or similar connecting devices.

Another object is to provide a device of this character in which the shovel blades are drawn together at the upper ends and connected in a hinged joint, the great length of which absolutely prevents any buckling or twisting movement of the blades and obviates the necessity of blade guides so annoying in the usual form of post-hole diggers.

A still further object is to provide a device of this character in which the handles are so secured to the shovel blades as to be positively held from working loose or snapping off as in the usual form of post hole diggers.

With the above advantages and other objects in view, which will appear as the nature of my invention is better understood, my invention consists of the novel details of construction and combination of parts illustrated in the accompanying drawing shown in the following specification and set forth in the appended claims.

In the accompanying drawing,—Figure 1 is a perspective view of a post-hole digger constructed in accordance with my invention. Fig. 2 is an end elevation of the same shown in open position and dotted in closed position.

In a more detailed description of my invention in which like characters of reference designate similar parts in the view shown, 1 designates the shovel blades which are preferably formed from a single piece of sheet metal of suitable width and thickness to give a sufficient strength and rigidity to the blades.

The lower portion of each cutter blade is bulged or arched outwardly and terminates in a rounded cutting edge 2 adapted to penetrate the ground.

The upper portion 3 of each blade is flattened and inclined inwardly, as shown, and is slightly less in width than the width of the shovel blade.

The upwardly inclined upper portions of the shovel blades terminate in hinged lugs 4 through which a pintle 5 is engaged to connect the shovel blades together in a hinged joint.

It will be noted that the shovel blades have a relative movement in a plane at right angles to the hinge and that this hinge is approximately the same in width as the width of the shovel blades, this peculiar construction enabling the blades to be subjected to an abnormal amount of racking strain without any tendency to buckle or twist off from the hinge.

Secured to the inwardly inclined upper portion of the shovel blades below the hinge are handles 6 and 7. The handles are off set outwardly adjacent their lower ends to conform to the inclined upper portions of the shovel blades. The off set terminal portions 8 of the handles are engaged through keepers 9 carried by the shovel blades and are secured in position by bolts or similar connectors 10 engaged transversely through the shovel blade and terminals of the handles adjacent their ends. By this construction, the handles are held in contact throughout their entire length when the shovel blades are in their normal or open position in order that when the shovel blades have been driven into the post-hole and worked down to their proper depth, the handles may be slightly spread apart to force the shovel blades together and cause the earth contained therebetween to be held fast as the blades are lifted from the hole when the handles may be again compressed to allow the earth to drop out.

By removing the pintle from the hinge either section of the device may be used as a scoop shovel for clearing ditches, drains, etc.

From the foregoing description taken in connection with the accompanying drawing, it is thought that the construction and operation of my invention will be easily understood without a more extended explanation, it being understood that various changes in the form, proportion, and minor details of construction may be made without sacrificing any of the advantages or departing from the spirit of the invention.

What is claimed is:—

1. A post-hole digger comprising two similar shovel blades hinged together at their upper ends, the lower portion of each being arched outwardly, and the upper portion being flattened and inclined inwardly, and handle levers connected to said blades below said hinge.

2. A post-hole digger comprising two relatively movable shovel blades hinged together at the upper ends, each of said shovel blades having an outwardly arched lower portion terminating in a rounded cutting edge, and an inwardly inclined upper portion terminating in a hinge lug, a pintle engaging said lugs, and handles connected at their lower ends to the upper ends of said blades below said hinge.

3. In a post-hole digger, two relatively movable shovel blades, each having an outwardly bulged lower portion terminating in a rounded cutting edge, and an inwardly inclined flattened upper portion slightly less in width than the width of the lower portion and terminating in a hinge lug, a pintle engaging said hinge lugs, and handle levers, the lower ends of which are off set outwardly and connected to the upper flattened portions of said shovel blades below the hinged lugs.

In testimony that I claim the foregoing as my own, I have hereto affixed my signature in the presence of two witnesses.

JOHN M. HEFNER.

Witnesses:
G. E. SHIVE,
C. S. ELLINGTON.